US009477471B1

(12) United States Patent
Iyer et al.

(10) Patent No.: US 9,477,471 B1
(45) Date of Patent: Oct. 25, 2016

(54) MAINTAINING LOCK-FREE, HIGH FREQUENCY, HIGH PERFORMANCE COUNTERS IN SOFTWARE

(71) Applicant: VERSA NETWORKS, INC., Santa Clara, CA (US)

(72) Inventors: Sridhar Vishwanathan Iyer, Sunnyvale, CA (US); Apurva Mehta, Cupertino, CA (US)

(73) Assignee: VERSA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 14/793,635

(22) Filed: Jul. 7, 2015

(51) Int. Cl.
*G06F 9/46* (2006.01)
*G06F 9/30* (2006.01)
*G06F 9/50* (2006.01)

(52) U.S. Cl.
CPC .......... *G06F 9/3009* (2013.01); *G06F 9/5016* (2013.01); *G06F 9/5022* (2013.01)

(58) Field of Classification Search
CPC ... G06F 9/3009; G06F 9/5016; G06F 9/5022
USPC ........................................................ 718/104
See application file for complete search history.

(56) References Cited

U.S. PATENT DOCUMENTS

| | | | | |
|---|---|---|---|---|
| 8,028,286 B2* | 9/2011 | Fedorova | ............. | G06F 9/4881 718/102 |
| 8,117,618 B2* | 2/2012 | Holloway | ............. | G06F 9/4881 718/102 |
| 8,136,124 B2* | 3/2012 | Kosche | ............... | G06F 11/3447 714/47.1 |
| 8,201,178 B2* | 6/2012 | Kawachiya | ........... | G06F 9/3004 709/226 |
| 8,275,964 B2* | 9/2012 | Gara | ..................... | G06F 11/348 711/154 |
| 8,578,382 B2* | 11/2013 | Venkumahanti | ..... | G06F 11/3632 717/124 |
| 8,607,228 B2* | 12/2013 | Cota-Robles | ........ | G06F 11/3409 718/1 |
| 8,688,921 B2* | 4/2014 | Levanoni | ................ | G06F 9/467 711/141 |
| 8,776,061 B2* | 7/2014 | Levin | .................... | G06F 9/5016 370/229 |
| 8,806,270 B2* | 8/2014 | Adir | ..................... | G06F 11/3612 714/11 |
| 8,918,596 B2* | 12/2014 | Dice | ............................ | 711/151 |
| 2008/0040715 A1* | 2/2008 | Cota-Robles | ........ | G06F 11/3409 718/1 |
| 2008/0134185 A1* | 6/2008 | Fedorova | ............. | G06F 9/4881 718/102 |
| 2008/0177756 A1* | 7/2008 | Kosche | ............... | G06F 11/3447 |
| 2009/0100432 A1* | 4/2009 | Holloway | ............. | G06F 9/4881 718/103 |
| 2010/0122260 A1* | 5/2010 | Kawachiya | ........... | G06F 9/3004 718/103 |
| 2010/0228927 A1* | 9/2010 | Levanoni | ............ | G06F 11/1474 711/154 |
| 2010/0299668 A1* | 11/2010 | Venkumahanti | ..... | G06F 11/3632 718/102 |
| 2011/0173402 A1* | 7/2011 | Gara | ..................... | G06F 11/348 711/162 |

(Continued)

*Primary Examiner* — Qing Chen
(74) *Attorney, Agent, or Firm* — Nicholson De Vos Webster & Elliot LLP

(57) ABSTRACT

A first and second thread-local counter is allocated to a first and second thread respectively, where the first thread-local counter is updatable only by or on behalf of the first thread and the second thread-local counter is updatable only by or on behalf of the second thread. The first and second thread-local counter are updated and the updated values are communicated to a central process. The central process updates a single counter in a central database by a value equal to the sum of the updated counter values.

15 Claims, 7 Drawing Sheets

(56) References Cited

U.S. PATENT DOCUMENTS

| | | | | |
|---|---|---|---|---|
| 2011/0191775 A1* | 8/2011 | Omara | | G06F 9/46 |
| | | | | 718/102 |
| 2012/0159502 A1* | 6/2012 | Levin | | G06F 9/5016 |
| | | | | 718/104 |
| 2012/0227045 A1* | 9/2012 | Knauth | | G06F 9/3863 |
| | | | | 718/100 |
| 2013/0124920 A1* | 5/2013 | Adir | | G06F 11/3612 |
| | | | | 714/30 |
| 2014/0181423 A1* | 6/2014 | Dice | | G06F 9/5027 |
| | | | | 711/151 |
| 2014/0181473 A1* | 6/2014 | Dice | | G06F 9/4881 |
| | | | | 712/203 |
| 2014/0181484 A1* | 6/2014 | Callister | | G06F 9/46 |
| | | | | 712/229 |
| 2014/0181827 A1* | 6/2014 | Dice | | G06F 9/52 |
| | | | | 718/103 |
| 2015/0134602 A1* | 5/2015 | Nicholas | | G06F 17/30345 |
| | | | | 707/609 |
| 2015/0277922 A1* | 10/2015 | Bartik | | G06F 9/3851 |
| | | | | 712/215 |

\* cited by examiner

MAINTAINING LOCK-FREE, HIGH FREQUENCY, HIGH PERFORMANCE COUNTERS IN SOFTWARE

FIELD

The present invention relates to the field of computer software, and in particular to maintaining lock-free, high frequency, high performance counters in software.

BACKGROUND

Counters are used to keep track of various parameters in a computer system. For instance, counters are used to count the number of packets entering a system, number of packets dropped due to errors, number of sessions to a particular website established, etc. The counter values can be used for different purposes. For instance, counter values such as the number of packets received, number of packets dropped, etc., may be used for defining and verifying the service-level agreement of a service contract because they provide factual evidence that the service provider is billing for quality of service agreed for, and that the consumer is not using services that he is not billed for. For example, if company X charges $10 for 10G of data per month, counters provide a way to verify that the consumer is not consuming more than 10G of data per month, and X is actually providing 10G of data. As another example, counter values are commonly used for debugging purposes since, by adding counters to the entry and exit points of key modules within a system, it is relatively easy to narrow down a bug to a single module and further track the issue within it.

In hardware based networking solutions and certain software based solutions, the memory allocated for counters is hard carved. Updating a counter involves just writing to a fixed memory location. This approach is not feasible if the number of counters to be updated are unknown, such as in the case of the number of interfaces in a virtual networking appliance.

Some software implementations use atomic_adds or locks when incrementing the counters (if there is a possibility of parallel access). A software lock is a synchronization mechanism for enforcing limits on access to a resource in an environment where there are many threads of execution. Any lock uses extra resources, like the memory space allocated for locks, the CPU time to initialize and destroy locks, and the time for acquiring or releasing locks. The more locks a program uses, the more overhead associated with the usage.

Atomic operations (atomic_add here), on the other hand provide the same functionality in hardware. However on a multiprocessor system, this means locking other processors from accessing a variable.

Although these implementations are functionally straight forward, they are typically not centralized (there is typically no central infrastructure to query all the counters, update, or save them; but rather has to be done manually for each counter) and they suffer degraded performance in case of high access (e.g., locking access to a counter that gets updated many times a second severely degrades performance; using atomic_adds invalidates the cache line and nullifies any performance gain obtained through locality of reference).

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for maintaining lock-free, high frequency, high performance counters in software is described. Each one of multiple threads is allocated a set of one or more thread-local counters that only it can update, which allows these thread-local counters to be updated without the need of using atomic_adds or locks. The counter updates from each thread are communicated to a central process that collates and aggregates the values of the thread-local counters if necessary. The central process then updates the value of the counters in an in-memory database that can be accessed by other software that requests that data. The in-memory database may be persistent across reloads and can be shared between different instances of the system.

Figure 1:
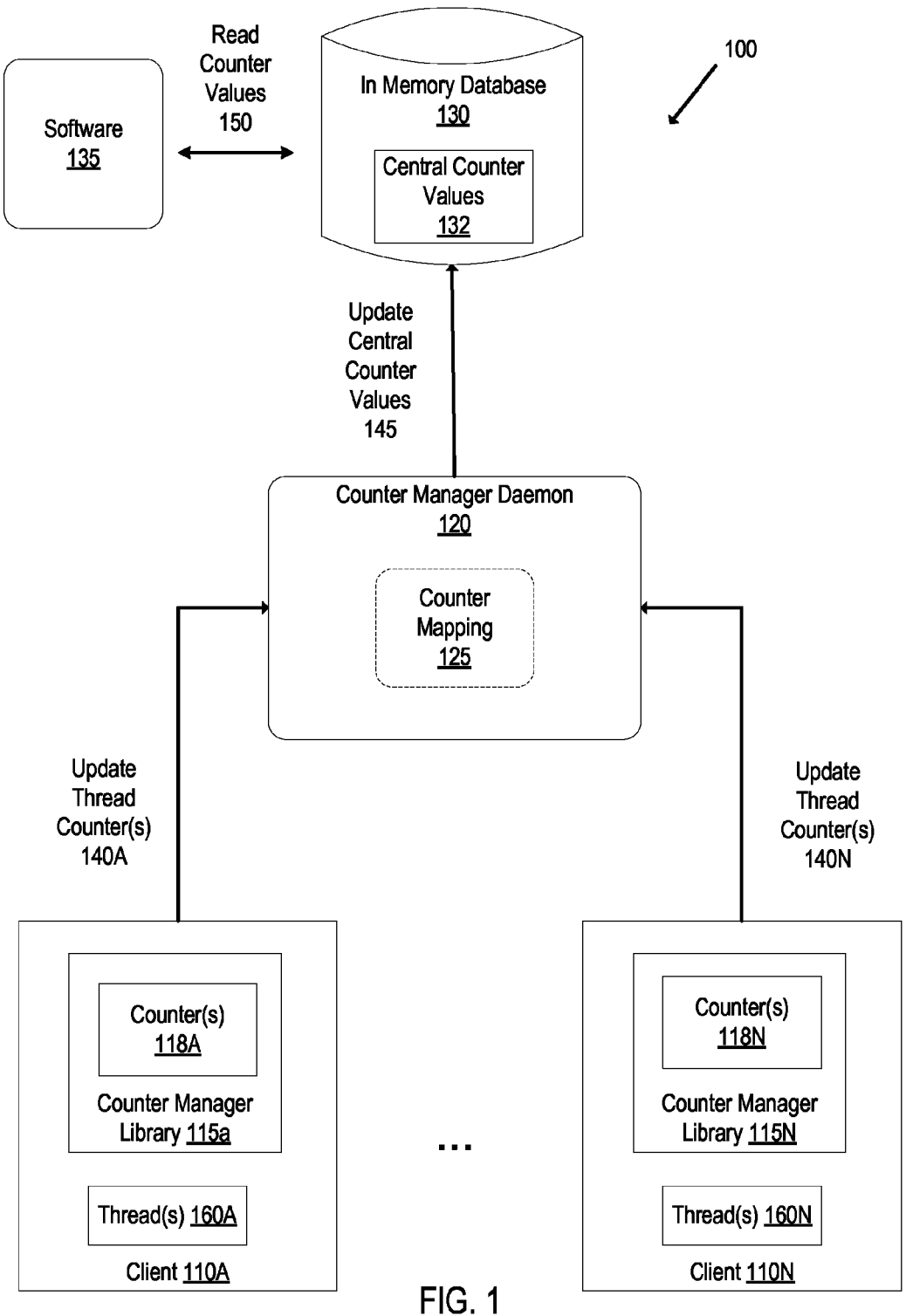
FIG. 1 illustrates an exemplary system for maintaining lock-free, high frequency, high performance counters in software according to some embodiments.

FIG. 1 illustrates an exemplary system for maintaining lock-free, high frequency, high performance counters in software according to some embodiments. The system 100 includes one or more clients 110A-N coupled with the counter manager daemon 120. Each client 110 can include one or more threads. The clients 110A-N may be software modules that may be running on the same physical machine or on different machines. An example client is an interface manager that manages a network interface of the system. The counter(s) 118A-N are software counters that are local to the clients 110A-N respectively and can be updated without the need of using atomic_adds or locks. The counter(s) 118A-N are allocated through use of the counter manager library 115A-N respectively, which will be described in greater detail later herein. The counter manager library 115A-N is also used to send updates 140A-N from the counter(s) 118A-N respectively to the counter manager daemon 120.

The counter manager daemon 120 is a central process that may run in the background that, among other things, aggregates counter updates from the clients 110A-N for the same counters. An example of a counter type is network interface counter type. There may be one or more counters for each counter type. For example, the network interface counter type may have a counter for packets received, a counter for bytes received, a counter for packets transmitted, and a counter for bytes transmitted. Using the example of a network interface, it should be understood that there may be multiple threads using that network interface (e.g., receiving and/or transmitting packets). For example, the system 100 may be a multi-core system with multiple threads capable of receiving and/or transmitting packets using the network interface. In such an example, each client 110 may have one or more threads that may receive and/or transmit packets at the network interface and separately update counter values accordingly. These separately updated counter values are aggregated by the counter manager daemon 120 for the same counter name. For instance, in a two-core system with two threads each having a counter for packets received, each thread may communicate counter updates to the counter manager daemon 120 for that counter and the counter manager daemon 120 aggregates the counter values such that the counter value will be equal to the number of packets received across the two threads. The counter manager daemon 120 may include a counter mapping 125 that provides a mapping between a unique counter identifier and a counter name, as will be described in more detail later herein. The counter manager daemon 120 updates 145 the central counter values 132 stored in the in-memory database 130. For example, the counter manager daemon 120 may transmit increment commands to the in-memory database 130 to increment the central counter values 132.

The in-memory database 130 is separated from the processes performing the counter updates. As a result, software 135, which may be internal software such as a command line interface or graphical user interface or external third party software, can read the counter values 150 from the in-memory database 130. The central counter values 132 stored in the in-memory database 130 may be persistent across reloads and may be shared between different instances of the system and/or different physical machines.

Figure 2:
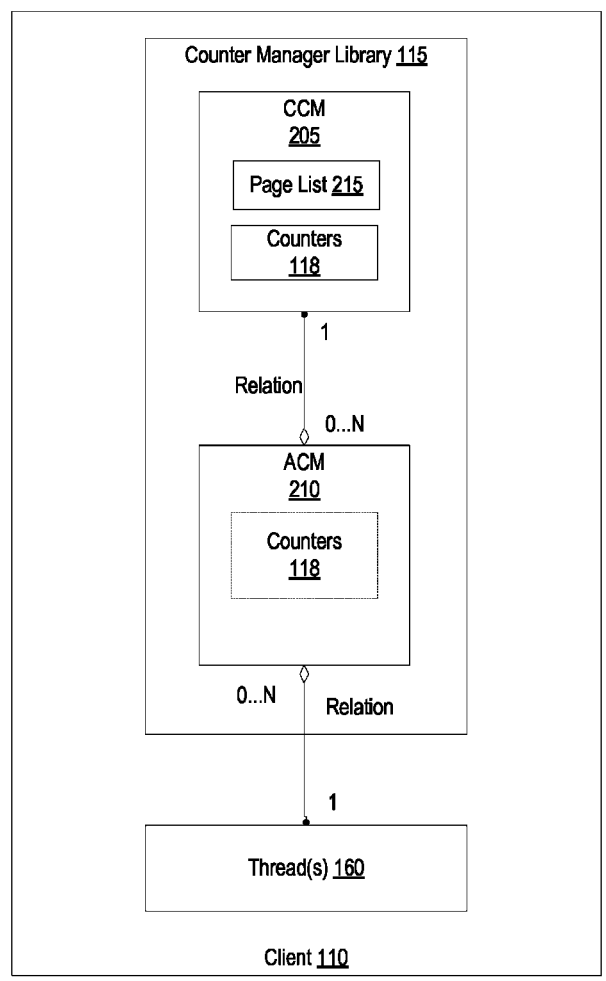
FIG. 2 illustrates an exemplary architecture of a client of the system according to one embodiment.

FIG. 2 illustrates an exemplary architecture of a client 110 according to one embodiment. The client 110 includes the counter manager library 115 that includes the counter context manager (CCM) 205 and the account context manager (ACM) 210. The one or more threads 160 use the counter manager library 115. The CCM 205 manages the allocation of the counters 118 and the CAM 210 maintains client specific context for the counters 118. An ACM object is client specific and thus is not shared between clients and handles the account of a particular set of counters. An example of an ACM object is network interface statistics that includes packets_transmitted and packets_received. The ACM object may provide an abstraction of a block of counters provided by the CCM 205. The memory for the counters resides within the CCM 205. When requesting allocation of a block of counters, the ACM object may receive a reference to the counters.

A thread 160 of the client 110 initializes a CCM object once. This initialization process includes starting a timer, at the expiration of which all of the counters 118 residing in the CCM object 205 are flushed to the counter manager daemon 120 which in turn updates the counters in the in-memory database 130. The CCM object 205 maintains a list of pages 215 and allocates the counters 118.

The CCM object 205 sends a registration message to the counter manager daemon 120 in response to the thread 160 allocating an ACM object 210. This registration message includes an identifier, which represents the location and instantiation of the ACM object 210, and a counter name. Multiple clients can register for the same counter name with different identifiers. This provides an efficient way for the counter manager daemon 120 to update the same counter. The thread 160 increments a counter by dereferencing the memory location of the counter.

Upon the timer expiring, the CCM object 205 walks through the page list 215 to determine the dirty counters and sends the identifier along with the number stored in the counters 118 to the counter manager daemon 120. This is sent in a message that is sometimes referred herein as an update counter message. The CCM object 205 also resets the counters 118 to zero.

The counter manager daemon 120 receives the update counter message from the CCM object 205 (as well as potentially other instantiated CCM objects from other clients regarding the same counter name), looks up the counter name in the counter mapping 125, and updates the values into the in-memory database 130.

Figure 3:
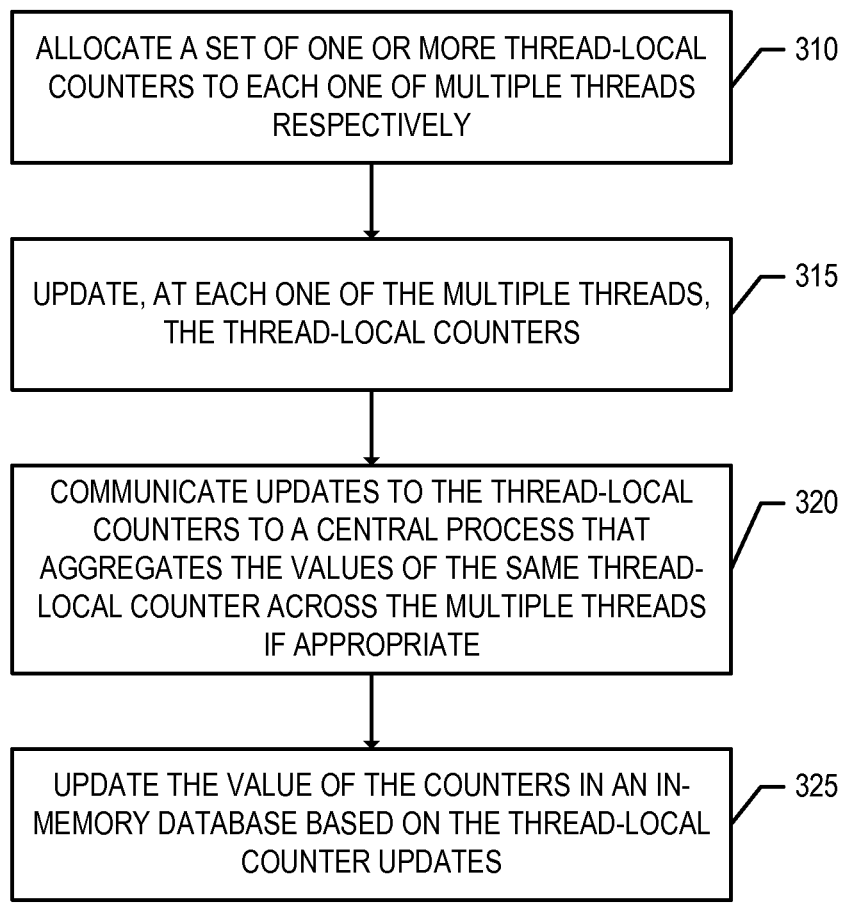
FIG. 3 is a flow diagram that that illustrates exemplary operations performed by the system for maintaining lock-free, high frequency, high performance counters in software, according to one embodiment.

FIG. 3 is a flow diagram that that illustrates exemplary operations performed by the system for maintaining lock-free, high frequency, high performance counters in software, according to one embodiment. The operations of this and other flow diagrams will be described with reference to the exemplary embodiment of FIGS. 1 and 2. However, it should be understood that the operations of the flow diagrams can be performed by embodiments other than those discussed with reference to FIGS. 1 and 2, and the embodiments discussed with reference to FIGS. 1 and 2 can perform operations different than those discussed with reference to the flow diagrams.

At operation 310, a set of one or more thread-local counters is allocated to each one of multiple threads respectively. Each thread-local counter can be updated by only the thread in which it is allocated. For example, the counter(s) 118A are allocated to one of the thread(s) 160A of the client 110A and the counter(s) 118N are allocated to one of the thread(s) 160N of the client 110N. The thread 160A that is allocated the counter(s) 118A can update those counters but cannot the counter(s) 118N. An embodiment of allocating the threads is described in greater detail with respect to FIGS. 4-6.

Next, at operation 315, the thread-local counter(s) are updated at each of the multiple threads. For example, the counter(s) 118A and the counter(s) 118N are updated. Next, at operation 320, the clients 110A-N communicate updates 140A-N to the thread-local counters to a central process (e.g., the counter manager daemon 120) that aggregates the values of the same thread-local counter across the multiple threads if appropriate, such as if the counter name is the same across the multiple threads. Each counter update 140A-N for a particular counter includes an identifier that is unique across the clients, which may be based on at least the thread ID and an identifier of the page that contains the counter. The central process determines the counter name for each counter update (e.g., using the counter mapping 125). After determining the counter name for each counter update, next, at operation 325, the central process (e.g., the counter manager daemon 120) updates the values of the counters in the in-memory database 130 based on the thread-local counter updates.

Embodiments described herein allow for the counters to be dynamically set, limited by the memory available in the system. In addition, the counter values are offloaded to the in-memory database that can be persistent across reloads and can be shared between different instances of the system. Since the counter values are offloaded to the in-memory database, software that wants to access the counter values (e.g., internal software such as the command line interface or graphical user interface or external third party software) can have lock-free access to the counter values.

The system described herein allows for much better performance than previous software counters. Previous software counter implementations that require locking access to a counter suffers degraded performance when that counter gets updated with high frequency. Consider, for example, a counter that gets updated 10 million times a second, and thus requires a lock to be added 10 million times a second, will have reduced performance. The use of atomic_adds also has degraded performance as an atomic_add will invalidate the cache line and nullifies any performance gain that is obtained due to locality of reference.

Figure 4:
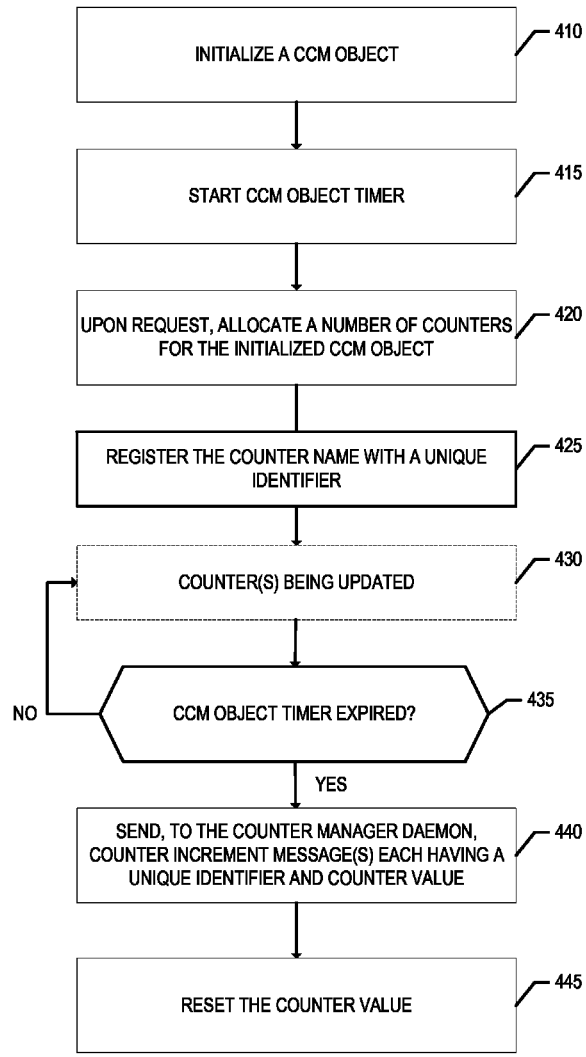
FIG. 4 is a flow diagram that illustrates exemplary operations performed by a component of the client according to one embodiment.
Figure 5:
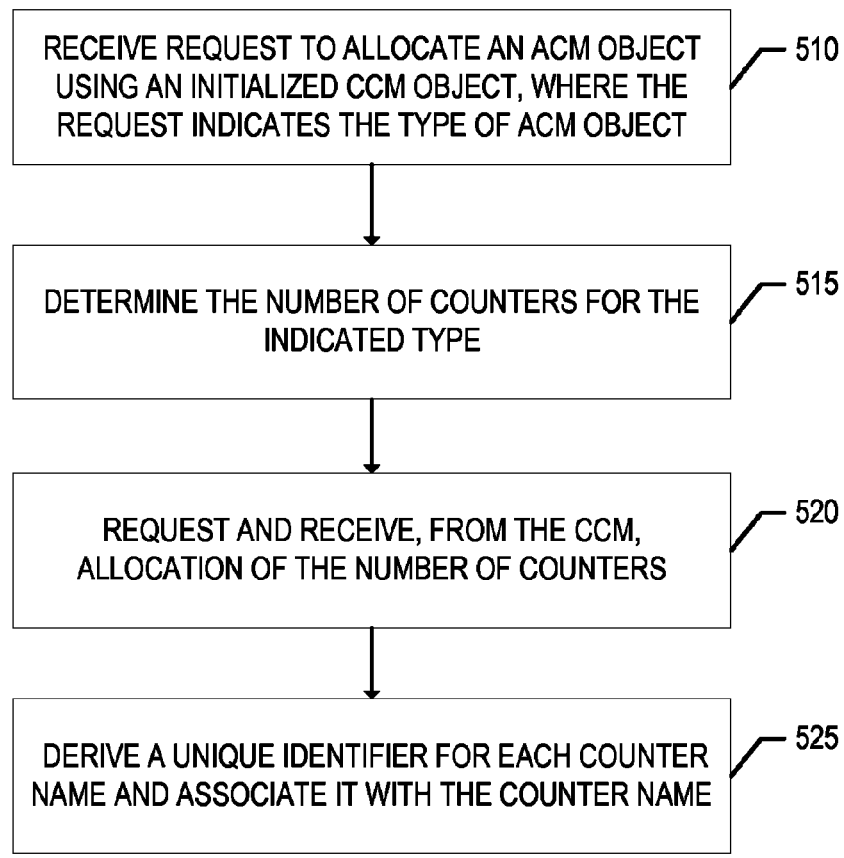
FIG. 5 is a flow diagram that illustrates exemplary operations performed by another component of the client according to one embodiment.

Operations describing a specific embodiment of the system will now be described with respect to FIGS. 4-6. FIG. 4 is a flow diagram that illustrates exemplary operations performed by a CCM object 205 according to one embodiment. At operation 410, a CCM object is initialized. For example, the thread 160 may call a function to initialize the CCM object 205. Flow then moves to operation 415 where a timer is started for the CCM object. This timer may be started by the CCM object 205.

Next, at operation 420, the CCM object 205, upon request, allocates a number of counters for the CCM object 205. For example, a function may be called to request a number of counters. In a specific implementation, the request can be made as a result of the thread 160 calling a function that allocates the ACM object 210 for the CCM object 205, specifying the type of that ACM object, which in turn may make a request for an allocation of a number of counters to the CCM object. For instance, FIG. 5 is a flow diagram that illustrates exemplary operations performed by the ACM object 210 according to one embodiment.

At operation 510, the ACM object 210 receives a request to allocate an ACM object using an initialized CCM object, where the request indicates the type of that ACM object. In a specific implementation, the request is made through the thread 160 calling a function that allocates the ACM object 210 for the CCM object 205, specifying the type of that ACM object. The function may take the form of ACM_ALLOC(TYPE,CCM), for instance, where CCM identifies the initialized CCM object. The type of that ACM object may indicate the number of counters needed. For instance, for an interface_counters type, there may be two counters; a counter for packets received and a counter for packets transmitted. Thus, at operation 515, the ACM object 210 determines the number of counters for the indicated type. Next, at operation 520, the ACM object 210 requests, and receives, from the CCM object 205 an allocation of the number of counters. For instance, the function ACM_ALLOC(TYPE, CCM) may call a function to the CCM object 205 to allocate a number of counters, specifying the number of counters to allocate based on the type. This function may take the form of CCM_ALLOC(CCM,NUM_OF_COUNTERS), for instance, where CCM identifies the initialized CCM object and the NUM_OF_COUNTERS identifies the requested number of counters to allocate, and the result of which is assigned to the interface_ACM structure. The interface_ACM structure provides an abstraction of the block of counters provided by the CCM object 205; the memory for the counters resides within the CCM object 205. Next, at operation 525, the ACM object 210 derives a unique identifier for each counter name and associates it with the counter name. The unique identifier represents the location and instantiation of the counter. In one embodiment, the unique identifier is generated using at least an identifier of the thread 160 and an identifier of the page that contains the counter. As a specific example, the unique identifier may be a 64 bit value that takes the format: <16 bits for vsn/appliance id> <16 bits for thread id> <16 bits for page id> <16 bits for index within the page>.

Referring back to FIG. 4, after allocating the requested number of counters, flow moves to operation 425 and the CCM object 205 sends a registration message to the counter manager daemon 120 to register the counter name with the unique identifier. This registration message is sometimes referred herein as a counter registration message. As will be described in greater detail later herein, the counter manager daemon 120 receives the counter registration message and creates a mapping between the counter name and the unique identifier. Flow moves from operation 425 to operation 430.

At operation 430, the counter(s) are updated. For example, the thread 160 may increment the counter by dereference the memory location of the counter. The counter(s) may be periodically updated by the thread 160. Flow then moves to operation 435 where a determination is made whether the CCM object timer has expired. If it has not, then flow moves back to operation 430 where the counter(s) are periodically updated. When the CCM object timer expires, flow moves from operation 435 to operation 440 where the CCM object 205 sends to the counter manager daemon 120, for each counter that was updated, a counter increment message that has a unique identifier and the counter value update. The CCM object 205 may determine which counter(s) have been updated by identifying those pages that include dirty counters (have been modified). The identifier may be dynamically derived based on the page that is read. It should be noted that there may be multiple counters that are updated and there may be multiple counter increment messages sent to the counter manager daemon 120. Next, at operation 445, the CCM object 215 resets the counter values that have been updated (e.g., by zeroing out those counter values).

Figure 6:
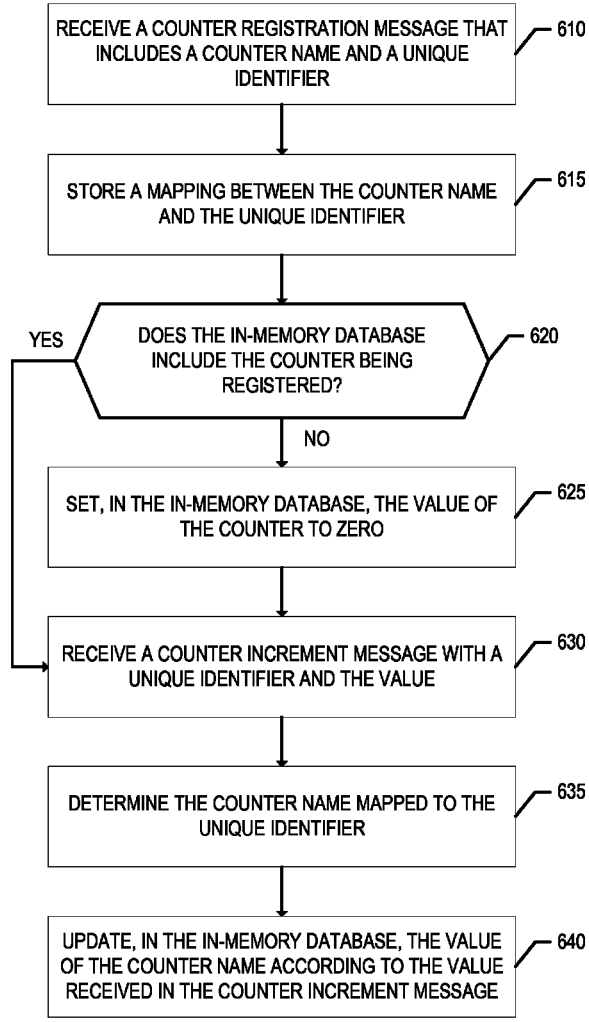
FIG. 6 is a flow diagram that illustrates exemplary operations performed by a centralized component of the system according to one embodiment.

FIG. 6 is a flow diagram that illustrates exemplary operations performed by the counter manager daemon 120 according to one embodiment. At operation 610, the counter manager daemon 120 receives a counter registration message from a client 110 that includes a counter name and a unique identifier. It should be understood that the counter manager daemon 120 may receive a counter registration message from multiple clients, with the same counter name, but having different unique identifiers.

Next, at operation 615, the counter manager daemon 120 stores a mapping between the counter name and the unique identifier that was received in the counter registration message. This mapping is referred to as the counter mapping 125 in FIG. 1. In one embodiment, the counter mapping 125 is in the form of a hash table that associates the unique identifier with the counter name; although other types of data structures may be used with embodiments described herein.

Next, at operation 620, the counter manager daemon 120 determines whether the in-memory database 130 includes the counter being registered. For example, the counter manager daemon 120 queries the in-memory database 130 for the counter. If the counter is not included in the in-memory database 130, the counter manager daemon 120 creates and sets, in the in-memory database 130, the value of the counter to be zero at operation 625 and flow then moves to operation 630. If the counter is included in the in-memory database 130 (e.g., it may have been registered by a different client), then flow moves from operation 620 to operation 630.

At operation 630, the counter manager daemon 120 receives a counter increment message with a unique identifier and a counter value from a client 110 for a registered counter. Next, at operation 635, the counter manager daemon 120 determines the counter name that is mapped to the unique identifier. For example, in the case that the counter mapping 125 is a hash table, the counter manager daemon 120 hashes the unique identifier to determine the counter name. Assuming that the counter name is determined, then flow moves to operation 640 where the counter manager daemon 120 updates, in the in-memory database 130, the value of the counter name according to the value received in the counter increment message. For example, the counter manager daemon 120 may generate a query to the database 130 that instructs the database 130 to increment the counter name by the value included in the counter increment message.

Figure 7:
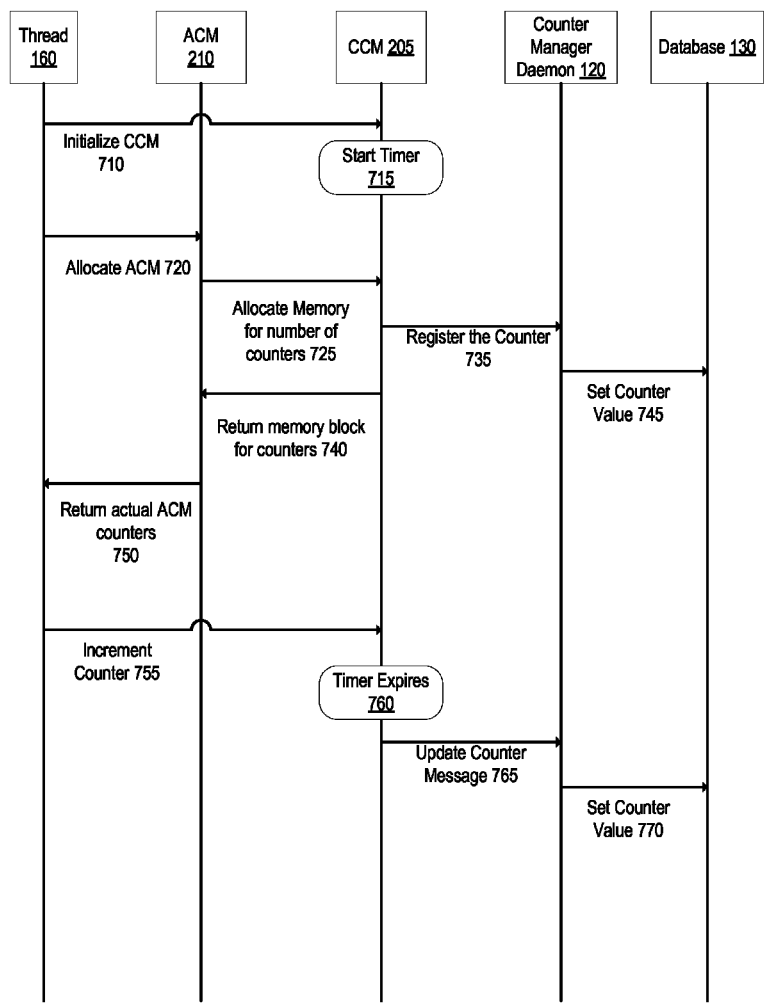
FIG. 7 is a sequence diagram that illustrates exemplary operations performed according to some embodiments.

FIG. 7 is a sequence diagram that illustrates exemplary operations performed according to some embodiments. The operations of FIG. 7 are described with respect to a single thread requesting allocation of counter(s); however it should be understood that multiple threads may perform similar operations when requesting allocation of counter(s).

At operation 710, the thread 160 executes code to initialize the CCM object 205. This in turn causes the CCM object 205 to start a timer 715. The thread 160 also executes code to request allocation of an ACM object. This request may specify the type of that ACM object. Next, at operation 725, the ACM object 210 determines the number of counters needed for the request and requests, from the CCM object 205, allocation of memory for the number of counters. The request may also indicate the name of the counter. The CCM object 205 allocates the memory for the counter(s) and returns a memory block for the counter(s) to the ACM object 210 at operation 740. At substantially the same time as returning the memory block for the counters, the CCM object 205 also registers the counter with the counter manager daemon 120. For instance, the CCM object 205 sends a registration message to the counter manager daemon 120 that includes an identifier at operation 735. The operations 735 and 740 may occur in either order and typically are performed at substantially the same time. The counter manager daemon 120 receives the counter registration message and stores a mapping between the counter name and the unique identifier that was received in the counter registration message. The counter manager daemon 120 also sets 745 the counter value in the database 130 to zero if the counter value is not already set.

After receiving the memory block for the counters in operation 740, the ACM object 210 may derive a unique identifier for each counter name and associate it with the counter name. The ACM object 210 also returns the counters to the thread 160 at operation 750. At some point, the thread 160 increments 755 a counter using conventional techniques. For instance, the thread 160 increments a counter by dereferencing the memory location of the counter, which is within a page of the CCM object 205. It should be understood that this counter may be incremented many times within a short amount of time, depending on the type of counter. When the timer of the CCM object 205 expires at operation 760, the CCM object 205 sends a message to the counter manager daemon 120 with an updated counter value at operation 765. This message may also include a unique identifier associated with the counter that has the updated value. The counter manager daemon 120 receives the counter increment message and determines the counter name that is mapped to the unique identifier. Assuming that the counter name is determined, the counter manager daemon 120 updates, in the in-memory database 130, the value of the counter name according to the value received in the counter increment message at operation 770. For example, the counter manager daemon 120 may generate a query to the database 130 that instructs the database 130 to increment the counter name by the value included in the counter increment message.

As described herein, instructions may refer to specific configurations of hardware such as application specific integrated circuits (ASICs) configured to perform certain operations or having a predetermined functionality or software instructions stored in memory embodied in a non-transitory machine-readable medium. Thus, the techniques shown in the figures can be implemented using code and data stored and executed on one or more electronic devices. Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for implementing counters in software, comprising:
    allocating a first thread-local counter to a first thread and allocating a second thread-local counter to a second thread, wherein the first thread-local counter is updatable only by or on behalf of the first thread and the second thread-local counter is updatable only by or on behalf of the second thread, and wherein the first thread-local counter and the second thread-local counter are each identifiable by a same name or same identifier;
    updating, by the first thread, a first value of the first thread-local counter;
    updating, by the second thread, a second value of the second thread-local counter;
    communicating, to a central process, the updated first value, the updated second value, a first identifier associated with the updated first value, and a second identifier associated with the updated second value;
    determining, by the central process, using the first identifier associated with the updated first value and the second identifier associated with the updated second value, that the updated first value and the updated second value belong to a same counter; and
    updating, by the central process, the same counter in a central database by a value equal to a sum of the updated first value and the updated second value.

2. The method of claim 1, further comprising:
    responsive to receiving a query at the central database for the value of the same counter, providing a current value of the same counter.

3. The method of claim 1, wherein the first thread and the second thread are threads executing on a first processor and a second processor respectively.

4. The method of claim 1, wherein the first thread and the second thread are threads executing on a first core and a second core of a single processor.

5. The method of claim 1, wherein the updated first value and the updated second value are communicated to the central process in response to a timer expiring.

6. An apparatus for implementing counters in software, comprising:
    a set of one or more processors and a set of one or more non-transitory machine-readable storage media, wherein the set of one or more non-transitory machine-readable storage media store instructions executable by the set of one or more processors to cause said apparatus to:
        allocate a first thread-local counter to a first thread and allocate a second thread-local counter to a second thread, wherein the first thread-local counter is updatable only by or on behalf of the first thread and the second thread-local counter is updatable only by or on behalf of the second thread, and wherein the first thread-local counter and the second thread-local counter are each identifiable by a same name or same identifier;
        update, by the first thread, a first value of the first thread-local counter;
        update, by the second thread, a second value of the second thread-local counter;
        communicate, to a central process, the updated first value, the updated second value, a first identifier associated with the updated first value, and a second identifier associated with the updated second value;
        determine, by the central process, using the first identifier associated with the updated first value and the second identifier associated with the updated second value, that the updated first value and the updated second value belong to a same counter; and
        update, by the central process, the same counter in a central database by a value equal to a sum of the updated first value and the updated second value.

7. The apparatus of claim 6, wherein the set of one or more non-transitory machine-readable storage media store instructions executable by the set of one or more processors to further cause said apparatus to:
    in response to receipt of a query at the central database for the value of the same counter, provide a current value of the same counter.

8. The apparatus of claim 6, wherein the first thread and the second thread are threads executing on a first processor of the set of one or more processors and a second processor of the set of one or more processors respectively.

9. The apparatus of claim 6, wherein the first thread and the second thread are threads executing on a first core and a second core of a single processor of the set of one or more processors.

10. The apparatus of claim 6, wherein the updated first value and the updated second value are communicated to the central process in response to a timer expiring.

11. A non-transitory machine-readable storage medium that stores instructions that, if executed by a set of one or more processors, cause said set of one or more processors to perform operations comprising:
    allocating a first thread-local counter to a first thread and allocating a second thread-local counter to a second thread, wherein the first thread-local counter is updatable only by or on behalf of the first thread and the second thread-local counter is updatable only by or on behalf of the second thread, and wherein the first thread-local counter and the second thread-local counter are each identifiable by a same name or same identifier;
    updating, by the first thread, a first value of the first thread-local counter;
    updating, by the second thread, a second value of the second thread-local counter;
    communicating, to a central process, the updated first value, the updated second value, a first identifier associated with the updated first value, and a second identifier associated with the updated second value;
    determining, by the central process, using the first identifier associated with the updated first value and the second identifier associated with the updated second value, that the updated first value and the updated second value belong to a same counter; and
    updating, by the central process, the same counter in a central database by a value equal to a sum of the updated first value and the updated second value.

12. The non-transitory machine-readable storage medium of claim 11, wherein the non-transitory machine-readable storage medium further stores instructions, that when executed by the set of one or more processors, cause the set of one or more processors to perform the following operation:
> responsive to receiving a query at the central database for the value of the same counter, providing a current value of the same counter.

13. The non-transitory machine-readable storage medium of claim 11, wherein the first thread and the second thread are threads executing on a first processor of the set of one or more processors and a second processor of the set of one or more processors respectively.

14. The non-transitory machine-readable storage medium of claim 11, wherein the first thread and the second thread are threads executing on a first core and a second core of a single processor of the set of one or more processors.

15. The non-transitory machine-readable storage medium of claim 11, wherein the updated first value and the updated second value are communicated to the central process in response to a timer expiring.

* * * * *